US009852623B2

(12) United States Patent
Nordbruch

(10) Patent No.: US 9,852,623 B2
(45) Date of Patent: Dec. 26, 2017

(54) CONTROLLING A PARKING LOT SENSOR

(71) Applicant: Robert Bosch GmbH, Stuttgart (DE)

(72) Inventor: Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/176,929

(22) Filed: Jun. 8, 2016

(65) Prior Publication Data

US 2016/0371974 A1 Dec. 22, 2016

(30) Foreign Application Priority Data

Jun. 16, 2015 (DE) ........................ 10 2015 211 053

(51) Int. Cl.

*B60Q 1/48* (2006.01)
*G08G 1/052* (2006.01)
*G08G 1/01* (2006.01)
*G08G 1/14* (2006.01)
*G08G 1/017* (2006.01)
*G08G 1/04* (2006.01)
*G08G 1/042* (2006.01)

(52) U.S. Cl.

CPC ........... *G08G 1/052* (2013.01); *G08G 1/0116* (2013.01); *G08G 1/0133* (2013.01); *G08G 1/146* (2013.01); *G08G 1/149* (2013.01); *G08G 1/0175* (2013.01); *G08G 1/04* (2013.01); *G08G 1/042* (2013.01)

(58) Field of Classification Search

CPC .......... G08G 1/14; G08G 1/141; G08G 1/142; G08G 1/145; G08G 1/146; G08G 1/149; G08G 1/168; G08G 1/052; G08G 1/0116; G08G 1/0133; G07F 17/246

USPC ..... 340/932.2, 933, 937, 941; 348/148, 149; 705/13

See application file for complete search history.

(56) References Cited

U.S. PATENT DOCUMENTS 6,426,708 B1 * 7/2002 Trajkovic ................. G08G 1/14 340/932.2
6,771,185 B1 * 8/2004 Yoo .......................... G08G 1/14 340/932.2
7,135,991 B2 11/2006 Slemmer et al.
7,868,784 B2 * 1/2011 Kuo ......................... G08G 1/14 340/932.2
8,723,688 B2 * 5/2014 Carboon .................. G08G 1/14 340/932.2
8,836,539 B2 * 9/2014 Lee ........................ G08G 1/042 340/932.2
2006/0152349 A1 7/2006 Ratnakar
2006/0212344 A1 9/2006 Marcus et al.
(Continued)

FOREIGN PATENT DOCUMENTS

CN 104700627 A 6/2015
EP 2418508 A1 2/2012
(Continued)

*Primary Examiner* — Thomas Mullen
(74) *Attorney, Agent, or Firm* — Norton Rose Fulbright US LLP; Gerard Messina

(57) ABSTRACT

A parking lot sensor includes a sensor for scanning a parking space for a vehicle. A method for controlling the parking lot sensor includes steps of determining an activity of vehicles in the parking lot, of determining a scanning frequency on the basis of the activity and of controlling, as a function of the scanning frequency, the sensor respectively for carrying out a scan.

11 Claims, 2 Drawing Sheets

(56) References Cited

U.S. PATENT DOCUMENTS

| | | | | |
|---|---|---|---|---|
| 2012/0274482 | A1* | 11/2012 | Chen | G08G 1/144 340/932.2 |
| 2013/0135118 | A1* | 5/2013 | Ricci | G08G 1/143 340/932.2 |
| 2014/0214500 | A1 | 7/2014 | Hudson et al. | |
| 2014/0218527 | A1 | 8/2014 | Subramanya | |

FOREIGN PATENT DOCUMENTS

| | | | |
|---|---|---|---|
| EP | 2546795 | A2 | 1/2013 |
| WO | 2016041170 | A1 | 3/2016 |

* cited by examiner

CONTROLLING A PARKING LOT SENSOR

CROSS REFERENCE

The present application claims the benefit under 35 U.S.C. §119 of German Patent Application No. DE 102015211053.2 filed on Jun. 16, 2015, which is expressly incorporated herein by reference in its entirety.

FIELD

The present invention relates to a parking lot sensor. The present invention in particular relates to controlling the parking lot sensor for scanning a measuring area in order to determine the presence of a vehicle.

BACKGROUND INFORMATION

A parking lot includes multiple parking spaces, in which respectively one vehicle may be parked. A management system for the parking lot includes a parking lot sensor at every one of the parking spaces, a central processing device and a communication network between the parking lot sensors and the processing device. Each parking lot sensor determines whether or not a vehicle is located in the parking space assigned to it. The parking lot sensor transmits the result of this determination to the management system, which thereupon is able for example to make arrangements so that free parking spaces become occupied or to charge for occupied parking spaces.

Each parking lot sensor includes a sensor for scanning the parking space. The sensor may implement one of several conventional measuring principles. The parking lot sensor may be operated by a battery that has a limited capacity. Additionally or alternatively, the parking lot sensor may also be designed to supply itself with energy, for example by energy harvesting. An average power consumption of the parking lot sensor may generally depend on how frequently determinations are made by the sensor. To save energy, it is therefore advantageous to perform scans as seldom as possible. On the other hand, this also increases a response time of the parking lot sensor such that it is possible that the parking lot sensor misses a change of a vehicle parked in the parking space. In practice, an attempt is therefore made to define a scanning frequency of the parking lot sensor in such a way that an acceptable compromise is achieved between a low power consumption and a short response time.

The present invention is based on the objective of indicating a technology for controlling a parking lot sensor that allows for the formation of an improved compromise.

SUMMARY

A method for controlling a parking lot sensor, which includes a sensor for scanning a predetermined measuring area, includes steps of determining an expected fluctuation of vehicles in the measuring area, of determining a scanning frequency on the basis of the expected fluctuation and of controlling, as a function of the scanning frequency, the sensor respectively for carrying out a scan.

The frequency with which the sensor scans as to whether or not a vehicle is located in the measuring area is preferably high when a high fluctuation of vehicles is to be expected and low when the fluctuation is to be assumed to be low. The fluctuation indicates how frequently an average change occurs in the determination value of the presence of a vehicle in the measuring area.

If a low fluctuation is expected, then the scanning frequency may be low such that the sensor is only seldom in operation and a power consumption of the parking lot sensor is therefore low. If by contrast a high fluctuation is expected, then the response time of the parking lot sensor may be shortened such that it is possible to detect an entry or exit of a vehicle into or out of the measuring area with a shortened response time. In this manner, the seemingly contradictory requirements of a low energy consumption and a short response time may be combined.

A parking lot sensor includes a sensor for scanning a parking space for a vehicle. A method for controlling the parking lot sensor includes steps of determining an activity of vehicles in the parking lot, of determining a scanning frequency on the basis of the activity, and of controlling, as a function of the scanning frequency, the sensor respectively for performing a scan.

In contrast to other technologies for controlling the scanning frequency of the parking lot sensor, real data ascertained in real time are used such that the determined scanning frequency is able to reflect the activity conditions prevailing in the area of the parking lot in a realistic and responsive manner.

The parking lot sensor may be operated both with quick response and in an energy-saving manner. Delayed or false determinations of vehicles in the area of the parking space may be avoided by a sufficiently high scanning frequency. A sufficiently low scanning frequency is simultaneously able to reduce servicing and maintenance costs for the parking lot sensor. By saving energy, an environmental load may be reduced. Moreover, this may result in a functional reserve in the event of a poor energy supply situation of the parking lot sensor.

The parking lot sensor preferably has a limited energy reserve, it being possible for the sensor to be switched to an energy-saving state between scans. In particular, the sensor may be switched off between scans. The sensor may have a significant share in the current consumption of the parking lot sensor such that much energy may be saved by switching it off periodically.

This is true especially if the sensor implements an active measuring principle, in which a signal is actively sent out and an object's influence on the signal in the measuring area is evaluated. The emitted signal may include for example a light or radar signal, the reflection or echo of which is detected. Other examples for active measuring principles include an electromagnetic determination, a magnetic determination or a determination by ultrasound. It is also possible for multiple sensors to be provided that preferably follow different measurement principles.

The activity may be determined on the basis of signals of an infrastructure device for scanning vehicles in a traffic area of the parking lot. This makes it possible for the determination to disregard vehicles that are parked in parking spaces and are not part of the traffic in the parking lot.

In another specific embodiment, however, it is also possible for a number of the vehicles parked in parking spaces to enter into the determination of the activity.

The infrastructure device may be designed to determine a speed of a vehicle in a traffic area and to determine the activity on the basis of the speed. A high speed may result in the determination of a low activity, and a low speed may result in the determination of a high activity. It is also possible to determine a distribution of speeds across vehicles, the activity being determined on the basis of the speed distribution, for example as a function of the average value or of the standard deviation.

The infrastructure device may also be designed to determine a waiting time of a vehicle in a traffic area and to determine the activity on the basis of the waiting time. A waiting time occurs when a vehicle is ready to drive in a traffic area, but is unable to drive for reasons of traffic volume. A long waiting time may result in the determination of a high activity, and a short waiting time may result in the determination of a low activity. It is also possible to determine a distribution of waiting times across vehicles, the activity being determined on the basis of the waiting time distribution, for example as a function of the average value or the standard deviation.

For example, in a parking lot, in an underground parking facility or in a multi-story parking garage, multiple parking spaces may be provided, which are each assigned one parking lot sensor. In different specific embodiments, it is then possible to determine scanning frequencies for an individual parking lot sensor, for a group of parking lot sensors or for all parking lot sensors of the parking lot. By combining several—or all—parking lot sensors into one group, which uses the same scanning frequencies, it is possible to reduce the expenditure of determination for individual scanning frequencies. It is preferred that the parking lot sensors of one group are similar in terms of traffic engineering, that is, that they may be reached via the same entrance for example. The parking lot sensors of one group should also be located as near to one another as possible. In a multi-story parking garage, for example, parking lot sensors of the same level may be grouped together.

A computer program product has program code for carrying out the method described above when it is run on a processing device or is stored on a computer-readable data carrier.

A parking lot sensor for a parking lot is designed to receive a scanning frequency and to determine the presence of a vehicle in the area of a parking space with the scanning frequency.

The parking lot sensor may in particular have a limited energy reserve and may be designed to switch a sensor for determining the presence of a vehicle in the area of the parking space into an energy-saving state between scans.

A parking system for a parking lot includes the above-described parking lot sensor, an infrastructure device for detecting vehicles in a traffic area of the parking lot and a processing device. The processing device is designed to scan the infrastructure device, to determine an activity of vehicles in the area of the parking lot on the basis of the scan, to determine a scanning frequency for a parking lot sensor on the basis of the activity, and to transmit the determined scanning frequency to the parking lot sensor.

BRIEF DESCRIPTION OF THE DRAWINGS

The present invention is described below in greater detail with reference to the figures.

DETAILED DESCRIPTION OF EXAMPLE EMBODIMENTS

Figure 1:
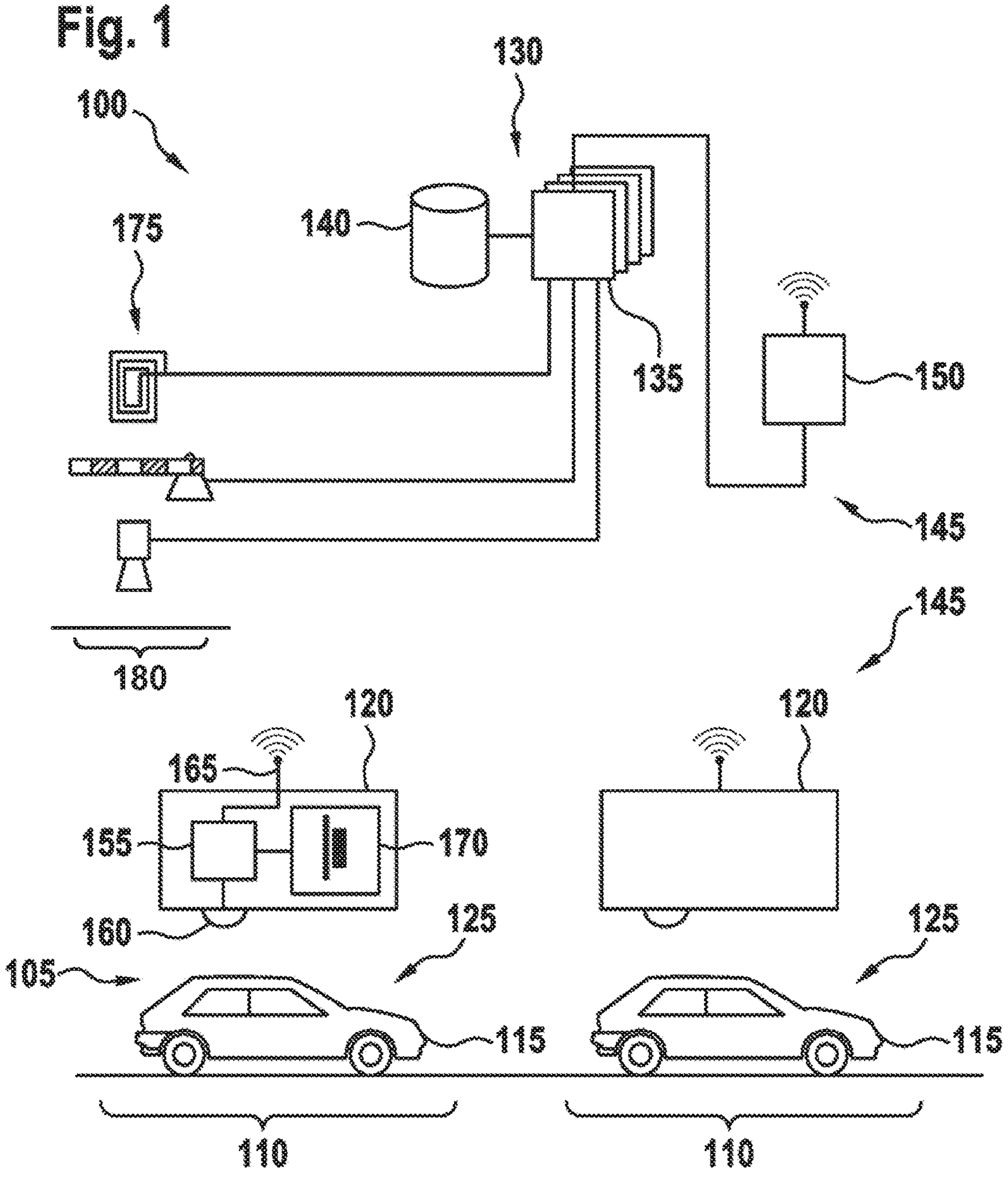
FIG. 1 shows an example system for managing a parking lot having multiple parking spaces.

FIG. 1 shows a management system 100 for a parking lot 105 having multiple parking spaces 110, which are designed respectively for a vehicle 115, preferably a motor vehicle. At one or multiple parking spaces 110, respectively one parking lot sensor 120 having a measuring area 125 is provided, which scans at least a portion of the space in which vehicle 115 may be parked in parking space 110. In the illustrated specific embodiment, parking lot sensor 120 is disposed above parking space 110 or motor vehicle 115, while in other specific embodiments parking lot sensor 120 may also be at another location, for example below vehicle 115 or at half height.

In the illustrated specific embodiment, parking lot sensor 120 is disposed above parking space 110 or motor vehicle 115, while in other specific embodiments parking lot sensor 120 may also be at another location, for example below vehicle 115 of at half height.

In addition to parking lot sensors 120, management system 100 also includes a central management unit 130, which preferably includes a processing device 135 and optionally a memory 140. Multiple management units 130 or processing devices 135 are also possible. A network 145 is provided for communication between central management unit 130 and parking lot sensors 120, which in the present example is partly wireless and partly wired, although purely wireless or purely wired specific embodiments are likewise possible. For converting data traffic between a wired and a wireless part of network 145, one or multiple gateways 150 are optionally provided. One part of network 145 may be implemented for example using WLAN, Bluetooth or mobile telephony.

Vehicle sensor 120 includes a control device 155, a sensor 160, and a communication device 165. An energy supply 170 also may be provided, which in one specific embodiment is able to supply only limited energy. For example, energy supply 170 may be a battery, a local device for supplying electrical energy such as a solar cell for example, or a combination of these. A central wired energy supply is also possible.

Sensor 160 may implement any physical measuring principle. For this purpose, sensor 160 may be passive, in that it evaluates a physical signal present in measuring area 125, or active, in that it provides a suitable physical signal in measuring area 125 and evaluates the influence of vehicle 115 on it. Examples of passive sensors include magnetometers and light sensors, while active sensors may include radar sensors, lidar sensors or ultrasonic sensors for example.

The present invention provides for a frequency, with which a vehicle sensor 120 by way of sensor 160 performs a determination about the presence of a vehicle 115 in the parking space 110, to be set dynamically as a function of an activity of vehicles 115 in the area of parking lot 105. For this purpose, a determination is preferably made as to whether a high activity or a low activity of vehicles 115 exists in the area of parking lot 105, that is, whether many or few vehicles 115 are moving in the area of parking lot 105. As a function of the activity, a scanning frequency is determined for one of parking lot sensors 120 and is transmitted to it, preferably via network 145. If the activity is high, that is, if many vehicles 115 are moving, then a high scanning frequency is chosen, and a low scanning frequency is accordingly chosen in the event of low activity.

To determine the activity, preferably signals of an infrastructure device 175 are evaluated. Preferably, multiple infrastructure devices 175 are scanned, and the scanned signals are preferably processed as a function of the type of infrastructure device 175 and its place of installation.

A first exemplary infrastructure device 175 includes an induction loop, which is able to determine the presence of a vehicle 115 in an area 180 such as a traffic area, an entrance or an exit of parking lot 105. In the process, it is also possible to determine a driving speed or a dwell time of vehicle 115. In this manner, it is possible for example to detect a traffic jam situation in the entrance or exit area 180 and to take it into account in a suitable manner. A second exemplary infrastructure device 175 includes a barrier, which is preferably installed in the area 180 of an entrance or an exit. The barrier or a comparable access control system is able to signal how many vehicles 115 per unit of time enter or exit parking lot 105. A third exemplary infrastructure device 175 is provided by a camera, which is mounted in the area 180 of parking lot 105 in order to monitor vehicles 115. The camera may be connected to a detection system for license plates (Automatic Number Plate Recognition, ANPR) so as to make it possible to reconstruct the movement of a vehicle 115 in the area 180 of parking lot 105 by analyzing the signals of multiple cameras. Other or additional infrastructure devices 175 may also be provided, for example a photoelectric barrier, a radar sensor, a lidar sensor or an ultrasonic sensor. Particularly in a parking lot 105 that is designed to be traveled by an autonomously controllable vehicle 115, such infrastructure devices 175 may already exist.

Processing device 135 or a dedicated separate processing device evaluates the signals of infrastructure devices 175 and determines the activity of vehicles 115, that is, effectively a traffic volume or a congestion in the area of parking lot 105. On the basis of the activity, a scanning frequency is then determined for at least one of parking lot sensors 120 and is transmitted to the latter. In a preferred specific embodiment, scanning frequencies for individual parking lot sensors 120 or groups of parking lot sensors 120 are determined and transmitted. The parking lot sensors 120 of a group may be mounted in proximity to one another or may be accessible by a vehicle 115 via a common access path. Although it is preferred that the specific scanning frequencies are transmitted individually to each parking lot sensor 120, a scanning frequency for a group of parking lot sensors 120 may also be transmitted by a multipoint connection (multicast), or a parking lot sensor 120 may transmit a received scanning frequency to another parking lot sensor 120 of the same group.

Figure 2:
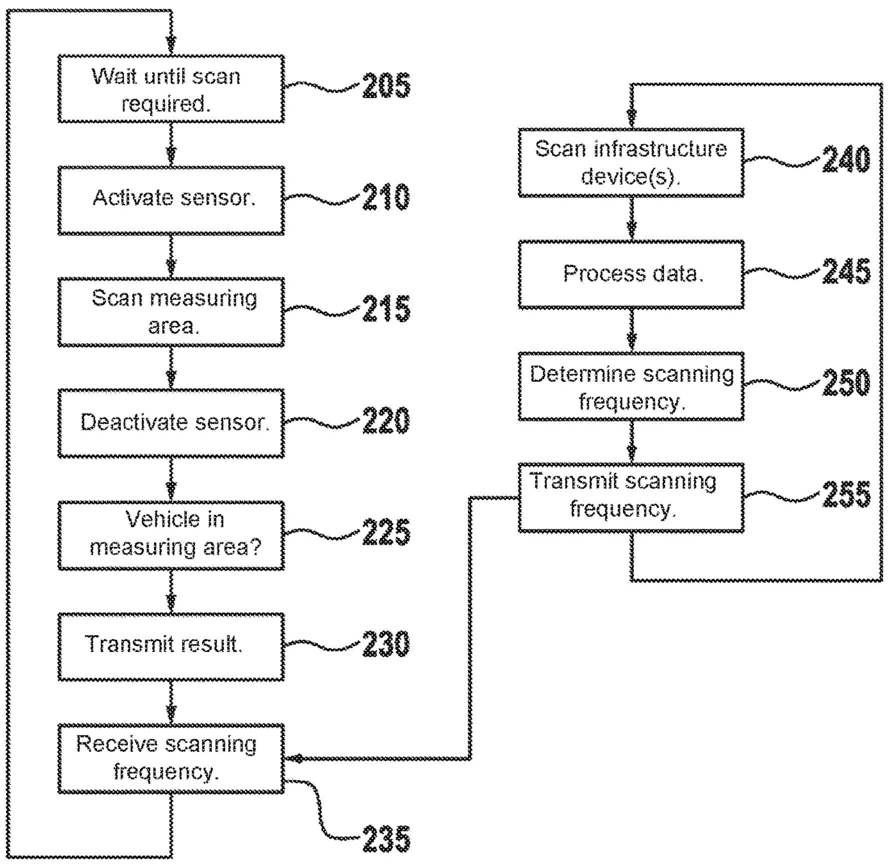
FIG. 2 shows a flow chart of an example method for controlling a parking lot sensor of the system of FIG. 1.

FIG. 2 shows a flowchart of a method 200 for controlling the parking lot sensor 120 of system 100 of FIG. 1. In a first step 205, vehicle sensor 120 waits as a function of a predetermined scanning frequency until a scan is required. If this is the case, then sensor 160 is activated in a step 210, and the measuring area 125 is scanned in a step 215, and sensor 160 is deactivated in a step 220. The activation may include switching sensor 160 on and the deactivation may include switching sensor 160 off. Depending on the construction or measuring principle of sensor 160, another procedure may be required, it being possible in particular for steps 210 and 220 to be omitted in the case of a passive sensor.

In a subsequent step 225, a determination is made on the basis of the scanning result as to whether or not a vehicle 115 is located in measuring area 125.

This determination is preferably made on the part of sensor 160 or on the part of control unit 155. In a step 230, the result of the determination is preferably transmitted via communication device 165 to central management unit 130. Under certain circumstances, for example if an occupancy state of parking space 110 has not changed, the transmission of the result of the determination may also be omitted. In a subsequent step 235, the scanning frequency is received for a new run through steps 205 through 235. This step may also occur at any other point in time when carrying out method 200. Subsequently, method 200 may return to step 205 and run through anew.

The scanning frequency received in step 235 is provided on the part of processing device 135. For this purpose, a separate portion of method 200 having steps 240 through 255 may be executed, which is described in the following. The two sub-methods of steps 205 through 235 and 240 through 255 may generally be executed concurrently or in parallel, it being possible for a synchronization to be performed or for an asynchronous operation to be implemented.

In a step 240, one or more infrastructure devices 240 are scanned. The data accumulating in the process are processed together in a step 245, if applicable with the aid of statistical data such as installation locations of the individual infrastructure devices 240, in order to determine the activity of vehicles 115 in parking lot 105. The activity depends on a number of vehicles 115 that are traveling in parking lot 105. This also includes vehicles 115 that must wait in a traffic area before they are able to proceed. In one specific embodiment, the activity additionally depends on the driving speed of a vehicle 115, a higher driving speed generally indicating a lower activity and a lower driving speed or even a standstill indicating a high activity. The longer the standstill, the higher the activity may be determined. For the speeds and standstill times, it is possible to form and evaluate average values or distributions across the individual vehicles 115.

Based on the determined activity, a scanning frequency is determined in a step 250. In a simple specific embodiment, only one scanning frequency is determined for multiple or all parking lot sensors 120, while in a more complex specific embodiment, scanning frequencies may be determined for groups of parking lot sensors 120 or for individual parking lot sensors 120. In a step 255, the determined scanning frequencies are transmitted to the parking lot sensors 120.

What is claimed is:

1. A method for controlling a parking lot sensor for scanning a parking space for a vehicle, the method comprising:

determining an activity of vehicles in a parking lot;

determining a scanning frequency based on the activity; and controlling, as a function of the scanning frequency, the sensor for performing a scan.

2. The method as recited in claim 1, wherein the activity is determined based on signals of an infrastructure device for scanning vehicles in a traffic area of the parking lot.

3. The method as recited in claim 2, wherein the infrastructure device is designed to determine a speed of a vehicle in a traffic area and to determine the activity on the basis of the speed.

4. The method as recited in claim 2, wherein the infrastructure device is designed to determine a waiting time of a vehicle in a traffic area and to determine the activity on the basis of the waiting time.

5. The method as recited in claim 1, wherein the parking lot includes multiple parking spaces, to each of which one parking lot sensor is assigned, and the scanning frequency for an individual parking lot sensor is determined.

6. The method as recited in claim 1, wherein the parking lot includes multiple parking spaces, to each of which one parking lot sensor is assigned, and the scanning frequency of a group of parking lot sensors is determined.

7. The method as recited in claim 1, wherein the parking lot includes multiple parking spaces, to each of which one parking lot sensor is assigned, and the scanning frequency of all parking lot sensors is determined.

8. A non-transitory computer readable storage medium storing program code for controlling a parking lot sensor for scanning a parking space for a vehicle, the program code, when executed by a processing device, causing the processing device to perform:

determining an activity of vehicles in a parking lot;

determining a scanning frequency based on the activity; and controlling, as a function of the scanning frequency, the sensor for performing a scan.

9. A parking lot sensor for a parking lot, wherein the parking lot sensor is designed to receive a scanning frequency based on an activity of vehicles in the parking lot and to determine the presence of a vehicle in the area of a parking space with the scanning frequency.

10. The parking lot sensor as recited in claim 9, wherein the parking lot sensor has a limited energy reserve and is designed to switch into an energy-saving state between scans.

11. A parking system for a parking lot, the parking system comprising:

a parking lot sensor designed to receive a scanning frequency and to determine the presence of a vehicle in the area of a parking space with the scanning frequency;

an infrastructure device for detecting vehicles in a traffic area of the parking lot; and a processing device designed to:

receive a signal from the infrastructure device;

determine, on the basis of the signal, an activity of vehicles in the traffic area of the parking lot;

determine, on the basis of the activity, a scanning frequency for the parking lot sensor; and transmit the determined scanning frequency to the parking lot sensor.

* * * * *